United States Patent
Roozrokh (10) Patent No.: US 9,902,550 B2
(45) Date of Patent: Feb. 27, 2018

(54) BOX WITH SIX OUTWARDLY FACING SURFACES AND AT LEAST ONE FLAP

(71) Applicant: Shahram Roozrokh, Huntington, NY (US)

(72) Inventor: Shahram Roozrokh, Huntington, NY (US)

( * ) Notice: Subject to any disclaimer, the term of this patent is extended or adjusted under 35 U.S.C. 154(b) by 0 days.

(21) Appl. No.: 14/871,178

(22) Filed: Sep. 30, 2015

(65) Prior Publication Data

US 2017/0088307 A1 Mar. 30, 2017

(51) Int. Cl.
*B65D 83/08* (2006.01)
*B60R 7/00* (2006.01)
*B60R 7/08* (2006.01)

(52) U.S. Cl.
CPC ............ *B65D 83/0805* (2013.01); *B60R 7/00* (2013.01); *B60R 7/084* (2013.01); *B65D 83/0894* (2013.01); *B65D 2209/00* (2013.01)

(58) Field of Classification Search
CPC .. A47K 10/421–10/422; A47K 10/424; A47K 2010/3233; B65D 5/02; B65D 5/4266; B65D 5/443; B65D 83/0805; B65D 83/0811; B65D 83/0817
USPC .... 206/45.29, 175, 233, 273, 494, 761, 804; 221/33, 52–53, 56, 197, 303, 305; 229/104, 120.08, 120.14, 120.17–120.18, 229/122.1–122.2, 242; D9/416–417, 432, D9/734
See application file for complete search history.

(56) References Cited

U.S. PATENT DOCUMENTS

| | | | | |
|---|---|---|---|---|
| 1,218,196 A * | 3/1917 | McCorkindale | ..... | A47K 10/422 221/52 |
| 2,739,735 A * | 3/1956 | Anderson, Jr. | .... | B65D 71/0022 206/169 |
| 3,202,316 A * | 8/1965 | Silver | ................ | B65D 83/0817 221/52 |
| 3,441,002 A * | 4/1969 | Skirvin | ................ | A01K 39/012 229/122.1 |
| 3,980,223 A * | 9/1976 | Curran | ............... | B65D 5/48028 229/120.27 |
| 4,616,767 A * | 10/1986 | Seido | .................... | A47K 10/421 221/58 |
| 4,925,087 A * | 5/1990 | Ostrander | ............ | B65D 5/5007 229/120.15 |

(Continued)

FOREIGN PATENT DOCUMENTS

DE 4006801 A1 * 9/1991 ........... B65B 27/083

*Primary Examiner* — Chun Cheung
*Assistant Examiner* — Brijesh V. Patel
(74) *Attorney, Agent, or Firm* — Scully, Scott, Murphy & Presser, P.C.

(57) ABSTRACT

The present disclosure is directed to a box. The box includes six outwardly facing surfaces, the surfaces comprising a first face spaced apart from a second face, a top face spaced apart from a bottom face, and a left side face substantially parallel to and spaced apart from a right side face, the surfaces forming an interior space of the box, and at least one flap formed in a first face, wherein the flap is configured for deflection from the surface of the first face into the interior of the box, wherein the box is configured to enclose one or more sheets in an interior of the box, wherein the at least one flap is configured to support the one or more sheets in a position nearer the top face than the bottom face.

6 Claims, 6 Drawing Sheets

(56) References Cited

U.S. PATENT DOCUMENTS

| | | | | |
|---|---|---|---|---|
| 5,390,820 A * | 2/1995 | Wright | ............... | B65D 83/0811 |
| | | | | 221/279 |
| 5,501,323 A * | 3/1996 | Denesha | ............ | B65D 83/0805 |
| | | | | 206/278 |
| 5,630,544 A * | 5/1997 | Shane | .................... | B65D 31/12 |
| | | | | 229/114 |
| 5,967,321 A * | 10/1999 | Sigl | ...................... | B65D 5/5028 |
| | | | | 206/233 |
| 6,394,338 B1 * | 5/2002 | Sluder | ...................... | B65D 5/18 |
| | | | | 229/120.15 |
| 6,863,192 B2 * | 3/2005 | Tumlinson | ........... | B65D 5/0005 |
| | | | | 221/45 |
| 6,877,634 B2 * | 4/2005 | Tramontina | ......... | A47K 10/424 |
| | | | | 221/311 |
| 7,699,189 B2 * | 4/2010 | Tramontina | ....... | B65D 83/0817 |
| | | | | 221/34 |
| 2015/0245746 A1 * | 9/2015 | Chorne | ................. | A47K 10/422 |
| | | | | 221/1 |

* cited by examiner

THE BOX IS POSITIONED TO BE
INSERTED IN DOOR POCKET

BOX WITH SIX OUTWARDLY FACING SURFACES AND AT LEAST ONE FLAP

BACKGROUND OF THE DISCLOSURE

Typical boxes, including boxes for woven and non-woven paper products, including napkins and tissues, that are designed for narrow spaces can deflect from the force of the space, making removal of the product from the box difficult. For example, a rectangular tissue box designed for use in the car, specifically to be placed in the area between a seat and a console, can be deflected or crushed, placing pressure on the tissues stored therein and making removal of the tissues difficult.

What is desired is a device for avoiding or reducing box deflection and allowing for removal of woven or non-woven products from the box more easily. What is also desired is that a narrower side of a box be configured to dispense the tissues and the box itself configured to not sufficiently degrade the removal of tissues upon application of an external pressure to the box. Thus, what is desired is a box that is configured to dispense tissues while receiving external pressure on the box and on the tissues within the box.

Embodiments of the present disclosure provide structures and methods that address the above and other issues.

SUMMARY OF THE DISCLOSURE

The present disclosure is directed to a box. The box includes six outwardly facing surfaces, the surfaces comprising a first face spaced apart from a second face, a top face spaced apart from a bottom face, and a left side face substantially parallel to and spaced apart from a right side face, the surfaces forming an interior space of the box, and at least one flap formed in a first face, wherein the flap is configured for deflection from the surface of the first face into the interior of the box, wherein the box is configured to enclose one or more sheets in an interior of the box, wherein the at least one flap is configured to support the one or more sheets in a position nearer the top face than the bottom face.

BRIEF DESCRIPTION OF THE DRAWINGS

The present disclosure will be better understood by reference to the following drawings of which.

DETAILED DESCRIPTION OF THE DISCLOSURE

As used herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially" refers to the complete or nearly complete extent or degree of an action, characteristic, property, state, structure, item, or result. For example, an object that is "substantially" parallel would mean that the object is either completely parallel or nearly completely parallel. The exact allowable degree of deviation from absolute completeness may in some cases depend on the specific context. However, generally speaking the nearness of completion will be so as to have the same overall result as if absolute and total completion were obtained.

Figure 1:
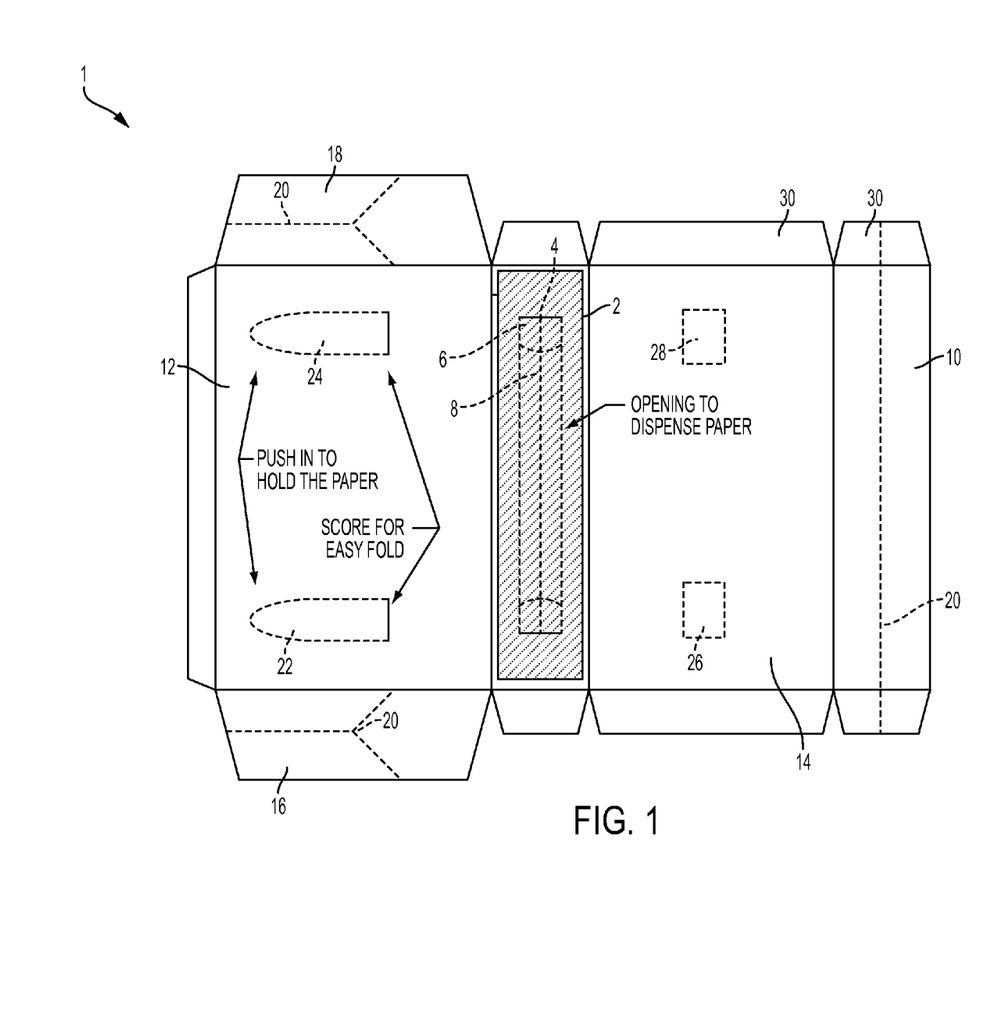
FIG. 1 is a plan view of an embodiment of the box.

The present disclosure is directed to a box 1 and a box 100 (shown in FIG. 5) having six outwardly facing surfaces, as discussed below. Box 1 and box 100 are containers from which woven and non-woven sheets of materials can be dispensed. These materials include but are not limited to tissues, wipes and towels. For exemplary purposes tissues are referred to herein, but this reference in no way limits the article that is dispensed. Box 1 and box 100 includes several surfaces as seen in FIG. 1 which is a view of the interior of box 1 as it is laid flat in an unassembled state. Many of the faces of box 1 and box 100 are shown as being rectangular in this embodiment, but in other embodiments these panels can have various shapes, including a rectangular shape with varying degrees of curved edges, substantially oval panels, substantially circular panels and the like. Further, box 1 and box 100, including the faces discussed below can be formed of any material suitable of substantially maintaining a shape upon assembly, such as paper and paper products, including paperboard, and can also be formed of plastics, metals, woods, any suitable man made material, any suitable synthetic material, and mixtures thereof. Also box 1 and box 100 is shown as being formed of a single piece of material, but in other embodiments box 1 and box 100 can be two or more pieces of material joined together.

The dimensions of box 1 and box 100 can be modified based on the desired result and size of tissue the box 1 or box 100 is to dispense. For example box 1 and box 100 can be about five inches wide, about two inches high and about six inches long. In other examples, each of these dimensions can be larger or smaller by up to 100% or more.

Box 1 includes a top face 2 having a top slot 4. Top slot 4 is shown as being substantially rectangular in this embodiment, but top slot 4 can be any suitable shape that is capable of exposing a tissue stored within box 1 to the exterior of box 1 and that is capable of allowing a tissue stored within box 1 to pass therethrough to the exterior of box 1. An optional film 6 can be secured to the interior of top face 2 and can include a slit 8, which is capable of allowing a tissue stored within box 1 to pass therethrough. Film 6 can be any suitable material, such as a plastic material.

Box 1 has six panels that face outwardly upon assembly. Top face 2, a bottom face 10, a first face 12, a second face 14, a left side face 16 and a right side face 18. Each of the faces includes a fold line that separates the face from the adjoining face, and which facilitates folding of the panels and assembly of the box, which is further described below.

Each of bottom face 10, left side face 16 and right side face 18 include fold line 20. Fold line 20 can be a crease in some embodiments, and a perforation in other embodiments. Fold line 20 allows for bottom face 10, left side face 16 and right side face 18 to deflect a portion of respective face away from the interior of box 1, after assembly.

There are also other arrangements of panels possible for box 1, such as bottom face 10 can be connected to first face 12 instead of second face 14. Other arrangements are also possible that maintain the operability of box 1.

Box 1 also optionally includes two flaps, a left side flap 22 and a right side flap 24. Both left side flap 22 and right side flap 24 include a fold line, represented by the solid line in FIG. 1, and a perforation, represented by the dashed line in FIG. 1.

Box 1 can also optionally include two openings, a left side tab 26 and a right side tab 28. Both left side tab 26 and right side tab 28 include a perforation about their periphery such that removal of these tabs creates a hole in second face 14.

In this embodiment there are two flaps, left side flap 22 and right side flap 24, and two tabs, left side tab 26 and right side tab 28, but in other embodiments box 1 can include one flap and one corresponding tab, three flaps and three corresponding tabs or more than three flaps and more than three corresponding tabs.

During assembly of box 1, the perforations of both left side flap 22 and right side flap 24 can be broken, so that left side flap 22 and right side flap 24 bend along the fold line. Also during use, the perforations around left side tab 26 and right side tab 28 can be broken, forming a left side hole and a right side hole, as further discussed below. Left side flap 22 can then be manipulated to extend into or through the hole formed by removal of left side tab 26 and right side flap 24 can then be manipulated to extend into or through the hole formed by removal of right side tab 28.

During assembly of box 1, the fold lines between each face can be folded along and the several margins (some of which are indicated as margins 30 in FIG. 1) can be attached to an interior surface of the box 1 with any suitable adhesive or the like. As shown in this embodiment of box 1 the angle formed between the margins, or between the faces and the margins 30 is about 30°, but in other embodiments this angle can be less than 20°, about 20°, 25°, 35° or 40° or more.

Figure 2:
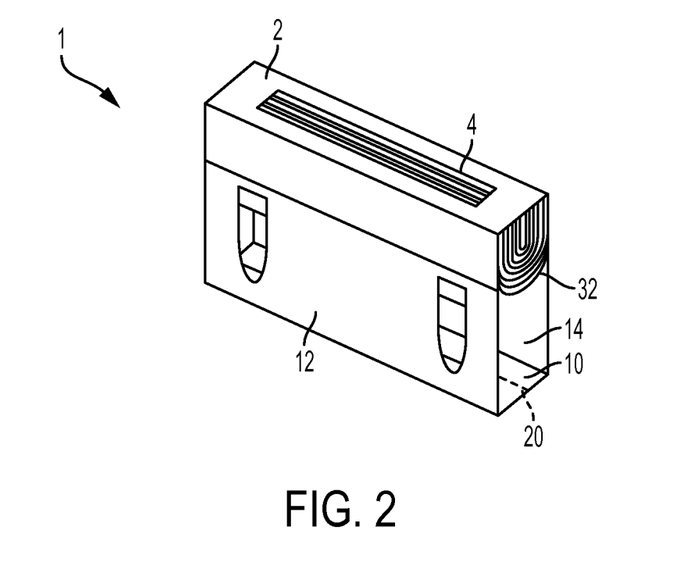
FIG. 2 is a perspective view of an embodiment of the box.

FIG. 2 is a view of box 1 in its assembled form, including a number of tissues 32. In this embodiment tissues 32 are enclosed within box 1 and are configured to be dispensed through top slot 4, but in other embodiments any woven or non-woven sheet-like material can be included in box 1. In FIG. 2, for illustrative purposes, left side face 16 is removed. As can be seen from FIG. 2, the perforations about left side flap 22 and right side flap 24 have been broken and left side flap 22 and right side flap 24 are folded into the interior of box 1.

In the embodiment shown in the figures, including FIG. 2, the stack of tissues 32 can have a V-fold ("inter-fold") or a Z-fold ("multi-fold"), or any other suitable folding pattern that is capable of effecting the or allowing for the withdrawal of a subsequent tissue upon the removal of the exposed tissue.

Figure 3:
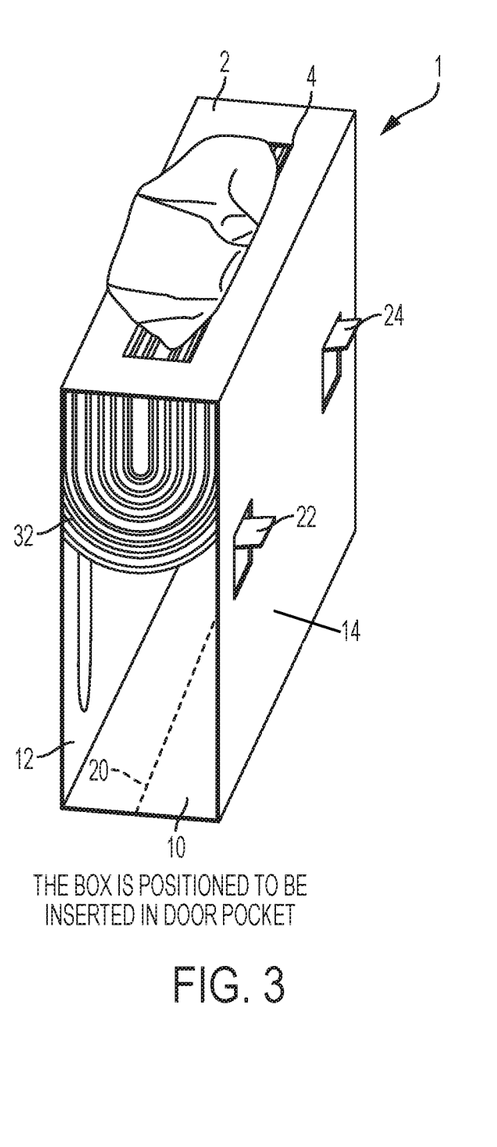
FIG. 3 is a perspective view of an embodiment of the box.

FIG. 3 is another view of box 1, also with left side face 16 removed for illustrative purposes. As can be seen from FIG. 3, left side flap 22 and right side flap 24 are extended through the holes formed by removal of left side tab 26 and right side tab 28. Once left side flap 22 and right side flap 24 are extended through the holes formed by removal of left side tab 26 and right side tab 28, tissues 32 are supported by left side flap 22 and right side flap 24, and are supported in a position nearer the top face 2 than the bottom face 10 of box 1.

Figure 4:
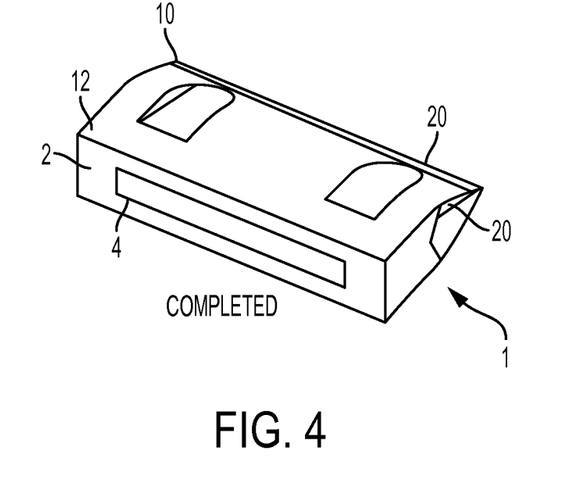
FIG. 4 is a perspective view of an embodiment of the box.

FIG. 4 is another view of box 1, with tissues 32 removed for illustrative purposes. The box 1 in this view has had fold lines 20 of bottom face 10 and left side face 16 and right side face 18 folded. As can be seen from FIG. 4, the fold line 20 on bottom face 10 is folded such that the fold line 20 of bottom face 10 forms an edge, thus deflecting a portion of bottom face 10 away from the interior of box 1. Upon folding of the fold line 20 on left side face 16 and right side face 18, an edge formed, thus deflecting portion of each of the left side face 16 and right side face 18 towards the interior of box 1.

In this embodiment the perforations about left side flap 22 and right side flap 24 have been broken and left side flap 22 and right side flap 24 are folded into the interior of box 1.

Figure 5:
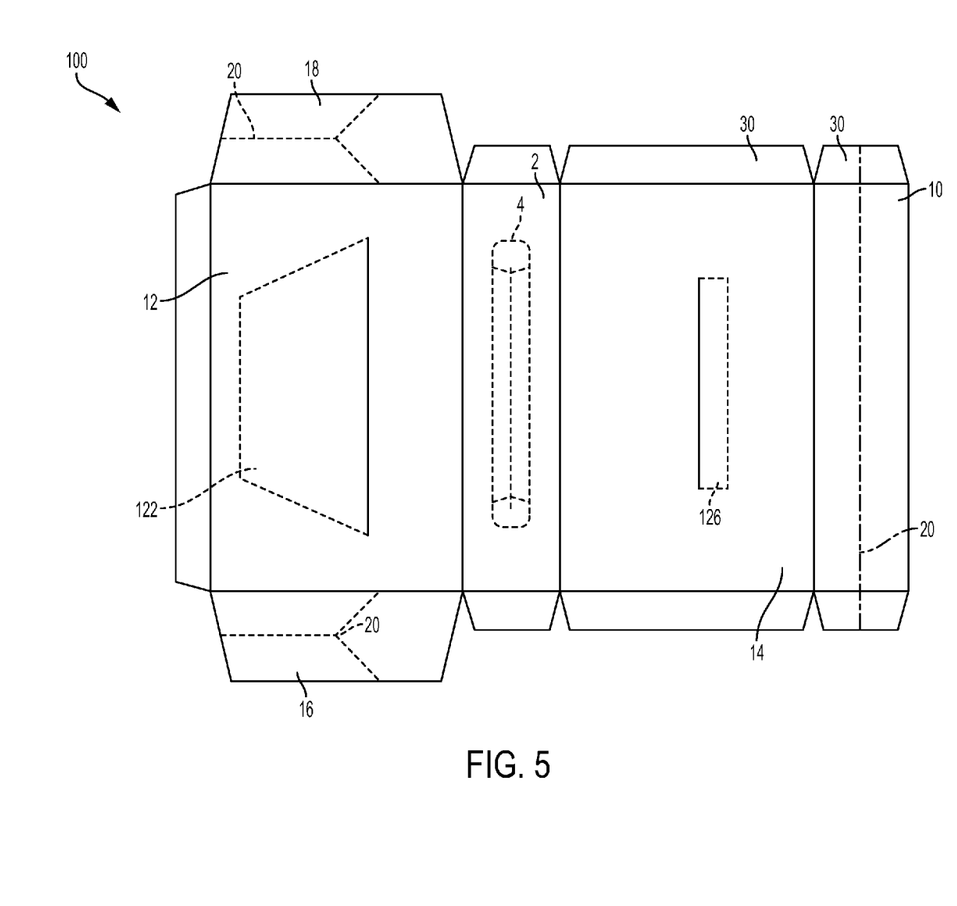
FIG. 5 is a plan view of another embodiment of the box.

Another embodiment of a box is shown in FIG. 5, a box 100. FIG. 5 is a plan view of box 100 illustrating the exterior surfaces of box 100 in an unassembled state. Elements that are similar between box 1 and box 100 are indicated with the same reference number.

Box 100 includes a flap 122. Flap 122 includes a fold line, represented by the solid line in FIG. 5, and a perforation, represented by the dashed line in FIG. 5.

Box 100 also includes a tab 126. Tab 126 can include a perforation about its periphery, such that tab 126 is capable of being fully removed from box 100. In this embodiment a portion of tab 126 includes a perforation, such that tab 126 can fold along the solid line in FIG. 5.

During assembly of box 100, the perforations of both flap 122 and tab 126 can be broken so that they each bend along their respective fold lines. Flap 122 can then be manipulated to extend into or through the opening formed by tab 126.

In this embodiment flap 122 is shown as being in a substantially trapezoidal shape, but, in other embodiments, flap 122 can be in any suitable shape that is capable of being manipulated to extend into or through the opening formed by tab 126.

Figure 6:
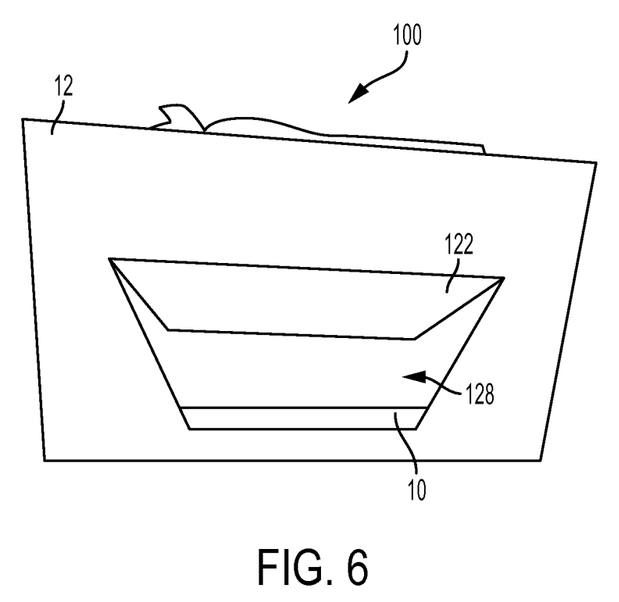
FIG. 6 is a perspective view of the other embodiment of the box.

FIG. 6 is perspective view of an assembled box 100. As can be seen from FIG. 6, the perforations of flap 122 are broken and flap 122 is folded along the fold line towards the interior of the box 100. Although not shown, flap 122 has been manipulated to extend through the opening formed by tab 126. Once flap 122 is manipulated, a cavity 128 is formed between flap 122 and bottom face 10. Cavity 128 can be used to store used various elements, for example used tissues that have been dispensed from box 100.

Box 1 and box 100 can be used in any suitable location, such as in any location that is relatively narrow like in an automobile between a seat and a console, or in an automobile in a door pocket or in an automobile in a visor. If the box 1 or box 100 is placed in a visor of an automobile, it is configured to not block the sight of the driver and allow for access to top face 2 and the tissues stored within box 1 and box 100. These non-exhaustive examples include just a few of the locations box 1 and box 100 can be used, but box 1 and box 100 can be placed and used in any suitable location.

The methods and devices of the present disclosure will be better understood by reference to the following Examples, which are provided as exemplary of the disclosure and not by way of limitation.

Example 1

In the present example, box 1 is received by a user in a similar configuration as that shown in FIG. 2. Originally, perforations of left side flap 22, right side flap 24, left side tab 26 and right side tab 28 would be intact. Then, the user would break the perforations of left side flap 22, right side flap 24, left side tab 26 and right side tab 28, removing left side tab 26 and right side tab 28. Then, the user would cause left side flap 22 and right side flap 24 to extend through the holes formed by removal of left side tab 26 and right side tab 28 as shown in FIG. 3. As seen in FIG. 3, this allows for tissues 32 to be supported by left side flap 22 and right side flap 24 and to be supported in a position nearer the top face 2 than the bottom face 10. Next the user folds fold lines 20 in bottom face 10, left side face 16 and right side face 18 so that box 1 appears as shown in FIG. 4.

After these steps are taken box 1 is placed between the driver's seat and the console of an automobile. Because the tissues 32 in box 1 are supported and held in relatively close proximity to top slot 4 pressure created between the seat and the console does not apply to the portion of box 1 holding the tissues.

Example 2

In the present example, box 100 is received by a user in a similar configuration as that shown in FIG. 5. Originally, perforations of flap 122 and tab 126 would be intact. Then, the user would break the perforations of flap 122 and tab 126

Then, the user would cause flap 122 to extend through the opening formed by tab 126. This allows for tissues to be supported by flap 122 and to be supported in a position nearer the top face 2 than the bottom face 10 of box 100. Next the user folds fold lines 20 in bottom face 10, left side face 16 and right side face 18 so that box 100 is in a similar configuration as box 1 is in FIG. 4.

After these steps are taken box 100 is placed between the driver's seat and the console of an automobile. Because the tissues in box 100 are supported and held in relatively close proximity to top slot 4 pressure created between the seat and the console does not apply to the portion of box 1 holding the tissues.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

The invention claimed is:

1. A box, the box comprising:
   six outwardly facing surfaces, the surfaces comprising a first face spaced apart from a second face, a top face spaced apart from a bottom face, and a left side face substantially parallel to and spaced apart from a right side face, the surfaces forming an interior space of the box; and
   at least two flaps formed in the first face, wherein each flap is configured for deflection from an exterior surface of the first face into the interior of the box along a flap fold line, each flap having an interior flap surface and an exterior flap surface, the exterior flap surface being a portion of the exterior surface of the first face, the interior surface of each flap being a portion of the interior surface of the first face,
   wherein the box is configured to enclose one or more sheets in the interior of the box, wherein each flap's interior flap surface being configured to support the one or more sheets in a position nearer the top face than the bottom face,
   wherein the second face of the box is configured with two or more tabs, the two or more tabs configured to form an opening in the second face along a tab fold line, and wherein the at least two flaps are configured to extend through openings formed by the two or more tabs, wherein the width of the flap fold line is substantially the same width as the width of the tab fold line.

2. The box of claim 1, wherein the bottom face comprises a fold line, the fold line configured to deflect a portion of the bottom face away from the interior of the box.

3. The box of claim 1, wherein the left side face and the right side face each comprise a fold line, the fold line configured to deflect a portion of the left side face and a portion of the right side face towards the interior of the box.

4. The box of claim 1, wherein the box comprises a slot in the top face of the box configured to expose the one or more sheets to an exterior of the box.

5. The box of claim 1, wherein the box is configured to form a cavity between the at least two flaps and the bottom face.

6. The box of claim 1, wherein the left side face and the right side face each comprise a fold line that extends partially along a first length of the left side face and partially along a first length of the right side face and does not extend along a second length of the left side face and a second length of the right side face.

* * * * *